United States Patent
Lee et al.

(10) Patent No.: US 7,522,902 B2
(45) Date of Patent: Apr. 21, 2009

(54) ADAPTIVE DC OFFSET COMPENSATION APPARATUS AND METHOD THEREOF

(75) Inventors: Jungwan Lee, Gyeonggi-do (KR); Jinkyu Lim, Gyeonggi-do (KR)

(73) Assignee: Integrant Technologies Inc., Gyneonggi-Do (KR)

( * ) Notice: Subject to any disclaimer, the term of this patent is extended or adjusted under 35 U.S.C. 154(b) by 427 days.

(21) Appl. No.: 11/466,721

(22) Filed: Aug. 23, 2006

(65) Prior Publication Data

US 2007/0046356 A1  Mar. 1, 2007

(30) Foreign Application Priority Data

Aug. 25, 2005 (KR) ............... 10-2005-0078107

(51) Int. Cl.
*H04B 1/26* (2006.01)
(52) U.S. Cl. ............... 455/324; 455/313; 455/333
(58) Field of Classification Search ............... 455/324, 455/333, 334, 296, 114.2, 118, 131, 139, 455/226.1, 313

See application file for complete search history.

(56) References Cited

U.S. PATENT DOCUMENTS

| | | | | |
|---|---|---|---|---|
| 2005/0181729 A1* | 8/2005 | Ibrahim et al. | ............. | 455/41.2 |
| 2005/0186933 A1* | 8/2005 | Trans | ......................... | 455/296 |
| 2005/0197064 A1* | 9/2005 | Ibrahim et al. | ............. | 455/41.2 |

* cited by examiner

*Primary Examiner*—Tony T Nguyen
(74) *Attorney, Agent, or Firm*—Foley & Lardner LLP

(57) ABSTRACT

Provided are a direct current (DC) offset compensation apparatus and a method thereof. A DC offset compensation apparatus comprises an offset detection block detecting a DC offset, an offset compensation block operating according to an output signal of the offset detection block, and an offset compensation amplifying block controlled according to an output signal of the offset compensation block. Particularly, the offset compensation block comprises a counter that counts polarities of DC offsets for a predetermined period, a controller that comprises first to fourth mode units respectively operating fast down-compensation, regular down-compensation, fast up-compensation, and regular up-compensation modes, and a control device that controls the execution of one selected among the first to fourth mode units based on a value counted by the counter, and a register storing data to control the offset compensation amplifying block based on the one mode unit determined by the controller.

11 Claims, 3 Drawing Sheets

ADAPTIVE DC OFFSET COMPENSATION APPARATUS AND METHOD THEREOF

This non-provisional application claims priority under 35 U.S.C. § 119(a) on Patent Application No. 10-2005-0078107 filed in Korea on Aug. 25, 2005, the entire contents of which are hereby incorporated by reference.

BACKGROUND OF THE INVENTION

1. Field of the Invention

The present invention relates to a DC offset compensation apparatus and a method thereof.

2. Description of the Background Art

A direct conversion receiver is being actively researched as one receiver structure to recover a signal received by an antenna. The direct conversion receiver converts an received radio frequency signal into a baseband signal at a time without being converted into an intermediate frequency (IF) signal. Thus, the direct conversion receiver can reduce sizes of external devices such as filters and a burden for processing digital signals. Due to these effects, the direct conversion receiver can be lightweight and manufactured at low costs. Also, a system-on-a-chip can be implemented.

FIG. 1 illustrates a simplified block diagram of a typical direct conversion receiver.

The typical direct conversion receiver includes a low noise amplifier (LNA) 101, a mixer 102, a filter 103, a variable gain amplifier 104, and a local oscillator 105, which is also labeled with a reference letter LO.

The LNA 101 is configured to control a gain and amplifies a signal received by an antenna while suppressing noise. The mixer 102 mixes an output signal of the LNA 101 with a signal provided from the local oscillator 105 and outputs a baseband signal. The filter 103 filters an intended signal from the amplified signal. The variable gain amplifier 104 amplifies a signal outputted from the filter 103 while controlling a gain to sustain a power level of a required output signal.

As described above, the typical direct conversion receiver illustrated in FIG. 1 can reduce sizes of external devices such as additional filters and a burden for processing digital signals.

However, the typical direct conversion receiver often has a DC offset, which may be a major cause of deteriorating the performance of the direct conversion receiver.

The DC offset event is generated by local oscillator leakage. Particularly, in the event that a radio frequency signal has a leakage component on an input side of the mixer 102 for a local oscillation signal, and this leakage component is reflected and supplied again as the local oscillation signal. Thus, the radio frequency signal received by the antenna is mixed with its own signal at the mixer 102.

Similarly, in the event that the local oscillation signal has a leakage component on an input side of the mixer 102 for the radio frequency signal, and this leakage component is reflected and inputted to the mixer 102 with the radio frequency signal, the local oscillation signal is mixed with its own signal, resulting in a generation of DC offset at an output terminal of the mixer 102. This type of DC offset is called self-mixing-oriented DC offset. A level of DC offset is not always consistent but continuously variable depending on a power level of a radio frequency signal, a frequency of the radio frequency signal and a frequency of a local oscillation signal.

The DC offset takes place at the output terminal of the mixer 102 due to a mismatch of a load existing at the output terminal of the mixer 102 and a duty error of the local oscillation signal inputted to the mixer 102. The duty error of the local oscillation signal varies depending on the frequency of the local oscillation signal, and thus, the DC offset generated by the duty error of the local oscillation signal varies depending on the frequency of the local oscillation signal.

When devices such as an amplifier and a filter included in a baseband circuit are mismatched with each other, an output signal of the receiver often has a DC offset. This Dc offset varies depending on a cut-off frequency of the filter 103 and a change in a gain of the variable gain amplifier 104.

The direct conversion receiver has a DC offset due to various factors, and a level of DC offset is not always consistent but continuously variable depending on various changes that actually occur while receiving a signal through an antenna. A frequency change in the local oscillation signal, a change in the received signal, a gain change in the amplifier are examples of the changes that cause the continuous variation in DC offset.

If the DC offset is severe, compensation is generally necessary as much as a level of the DC offset. If the DC offset is excessively compensated, another DC offset that is greater than the initial DC offset may be generated, resulting in various limitations that may be more severe than before the compensation is applied.

SUMMARY OF THE INVENTION

Accordingly, the present invention is directed to provide a DC offset compensation apparatus that can adaptively compensate for a DC offset to speed up the compensation according to a DC offset value changing continuously, and a method thereof.

The present invention is also directed to provide a DC offset compensation apparatus that can control a distortion event, which may occur due to an excessive level of compensation for a DC offset, and a method thereof.

According to an embodiment of the present invention, a direct current (DC) offset compensation apparatus comprises an offset detection block detecting a DC offset, an offset compensation block operating according to an output signal of the offset detection block, and an offset compensation amplifying block controlled according to an output signal of the offset compensation block, wherein the offset compensation block comprises a counter that counts polarities of DC offsets for a predetermined period using the output signal of the offset detection block, a controller that comprises a first mode unit operating a fast down-compensation mode for the DC offset, a second mode unit operating a regular down-compensation mode for the DC offset, a third mode unit operating a fast up-compensation mode for the DC offset, a fourth mode unit operating a regular up-compensation mode for the DC offset, and a control device controlling the execution of one selected among the first to fourth mode units based on a value counted by the counter, and a register storing data to control the offset compensation amplifying block based on the one mode unit determined by the controller.

Consistent with the embodiment of the present invention, the offset detection block may comprise a comparator.

Consistent with the embodiment of the present invention, the offset detection block may further comprise a low pass filter.

Consistent with the embodiment of the present invention, the first mode unit may be configured to subtract a positive integer A greater than 1 from a data value of the register; the second mode unit may be configured to subtract a positive integer B less than the positive integer A from the data value of the register; the third mode unit may be configured to add a positive integer C greater than 1 to the data value of the register; and the third mode unit may be configured to add a positive integer D less than the positive integer C to the data value of the register.

Consistent with the embodiment of the present invention, at a period after the predetermined period, the first mode unit of the controller may be configured to subtract a positive integer that is less than the positive integer A but greater than the positive integer B from the data value of the register; and the third mode unit of the controller may be configured to subtract a positive integer that is less than the positive integer C but greater than the positive integer D from the data value of the register.

According to another embodiment of the present invention, a DC offset compensation method comprises (a) initializing data stored on a register, (b) counting polarities of DC offsets for a predetermined period, (c) performing a first compensation mode in which a counted value obtained from the operation (b) is compared with a first reference value and a first offset compensation mode is performed for one case that the counted value is greater or less than the first reference value, (d) performing a second compensation mode in which the counted value obtained from the operation (b) is compared with a second reference value and a second offset compensation mode is performed for one case that the counted value is greater or less than the second reference value, (e) performing a third compensation mode in which the counted value obtained from the operation (b) is compared with a third reference value and a third offset compensation mode is performed for one case that the counted value is greater or less than the third reference value, and (f) performing a fourth compensation mode in which the counted value obtained from the operation (b) is compared with a fourth reference value and a fourth offset compensation mode is performed for one case that the counted value is greater or less than the fourth reference value.

Consistent with the other embodiment of the present invention, the DC offset compensation method may further comprise at the first compensation mode, subtracting a value of $2^n$ from the data value of the register, at the second compensation mode, subtracting a value of 1 from the data value of the register, at the third compensation mode, adding a value of $2^m$ to the data value of the register, and at the fourth compensation mode, adding a value of 1 to the data value of the register.

Consistent with the other embodiment of the present invention, the DC offset compensation method may further comprise performing a feedback operation returning to the operation (b) at a period after the predetermined period.

Consistent with the other embodiment of the present invention, the n may be a value of 6−N and the m is a value of 6−P, wherein the N and P may be another data values, which are integers, wherein the operation (a) may further comprise initializing the integers N and P; the operation (c) may further comprise comparing the integer P with a fifth reference value and storing a value of N+1 as the integer P if the integer P is less than the fifth reference value; each of the operations (d) and (f) may further comprise initializing the integers N and P; and the operation (e) may further comprise comparing the integer N with a sixth reference value and storing a value of P+1 as the integer N if the integer N is less than the sixth reference value.

Consistent with the other embodiment of the present invention, the N and P may have initialization values of 0; and the fifth and sixth reference values may be 5.

According to still another embodiment of the present invention, a computer readable recording medium that is implemented with a program to embody a DC offset compensation method comprises the instructions of (a) initializing data stored on a register, (b) counting polarities of DC offsets for a predetermined period, (c) performing a first compensation mode in which a counted value obtained from the operation (b) is compared with a first reference value and a first offset compensation mode is performed for one case that the counted value is greater or less than the first reference value, (d) performing a second compensation mode in which the counted value obtained from the operation (b) is compared with a second reference value and a second offset compensation mode is performed for one case that the counted value is greater or less than the second reference value, (e) performing a third compensation mode in which the counted value obtained from the operation (b) is compared with a third reference value and a third offset compensation mode is performed for one case that the counted value is greater or less than the third reference value, and (f) performing a fourth compensation mode in which the counted value obtained from the operation (b) is compared with a fourth reference value and a fourth offset compensation mode is performed for one case that the counted value is greater or less than the fourth reference value.

BRIEF DESCRIPTION OF THE DRAWINGS

The invention will be described in detail with reference to the following drawings in which like numerals refer to like elements.

DETAILED DESCRIPTION OF EMBODIMENTS

Embodiments of the present invention will be described in a more detailed manner with reference to the drawings.

Figure 1:
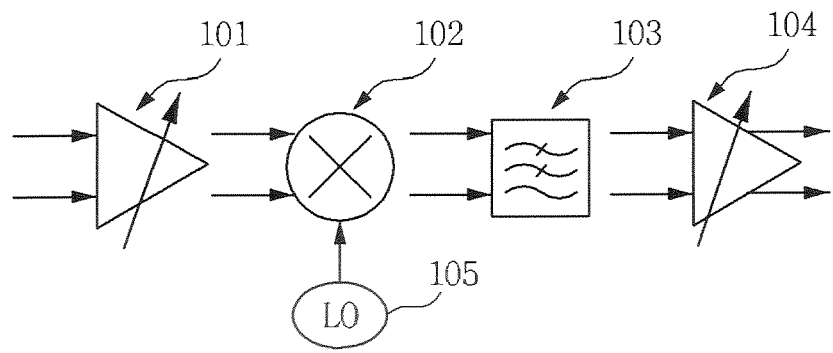
FIG. 1 illustrates a simplified block diagram of a typical direct conversion receiver.
Figure 2:
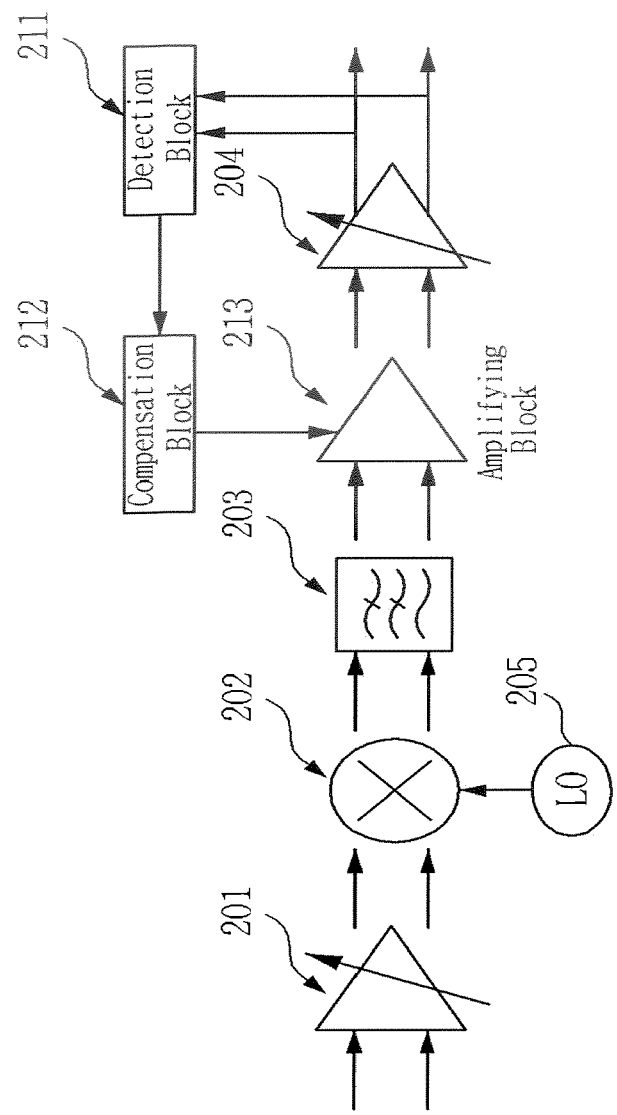
FIG. 2 illustrates a simplified block diagram of a direct conversion receiver comprising a DC offset compensation apparatus according to an embodiment of the present invention.

FIG. 2 illustrates a simplified block diagram of a direct conversion receiver comprising a DC offset compensation apparatus according to an embodiment of the present invention.

As similar to the typical direct conversion receiver, the direct conversion receiver according to the present embodiment comprises an LNA 201, a mixer 202, a filter 203, a variable gain amplifier 204, and a local oscillator 205

The DC offset compensation apparatus comprises an offset detection block 211, an offset compensation block 212 and an offset compensation amplifying block 213. The offset detection block 211 detects a DC offset event using an output signal of the variable gain amplifier 204. The offset compensation block 212 operates according to an output signal of the offset detection block 211. The offset compensation amplifying block 213 is controlled according to an output signal of the offset compensation block 212.

Figure 3:
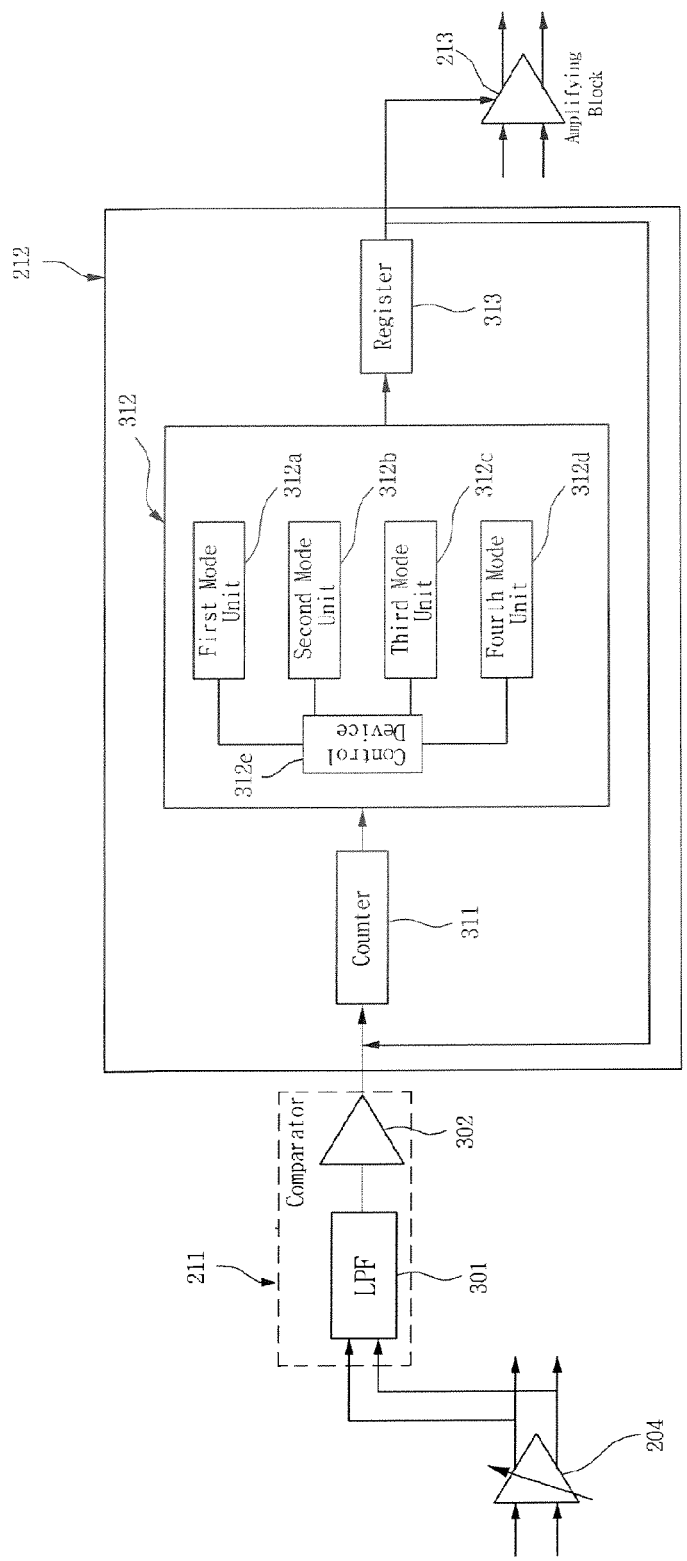
FIG. 3 illustrates a detailed block diagram of the DC offset compensation apparatus illustrated in FIG. 2.

FIG. 3 illustrates a detailed block diagram of the DC offset compensation apparatus illustrated in FIG. 2.

The offset detection block 211 receives an output signal of the variable gain amplifier 204 of the direct conversion receiver. The offset detection block 211 comprises a circuit that enables the determination of a polarity of the DC offset. In the present embodiment, the offset detection block 211 comprises a comparator 302. Also, the offset detection block 211 may further comprise a low pass filter 301 to detect signals around DC.

The offset compensation block 212 comprises a counter 311, a controller 312 and a register 313.

The counter 311 counts polarities of DC offsets from outputs of the offset detection block 211 for a predetermined period. For instance, if the predetermined period is approximately 64, the offset detection block 211 outputs '1' if the detected DC offset level is greater than '0' and, '0' if the detected DC offset level is less than '0'. Then, the offset detection block 211 transfers these outputs to the counter 311. The counter 311 counts the polarities of the DC offsets 63 times. Afterwards, the counter 311 counts the number of '1' and transfer the result to the controller 312. The counter 311 is reset at a $64^{th}$ period and then, counts polarities of DC offsets generated at a next period.

The controller 312 comprises an offset compensation mode portion that comprises a first mode unit 312a, a second mode unit 312b, a third mode unit 312c, and a fourth mode unit 312d. On the basis of the number counted at the counter 311, the first to fourth mode units 312a to 312d are in charge of a fast down-compensation mode, a regular down-compensation mode, a fast up-compensation mode, and a regular up-compensation mode, respectively. The controller 312 comprises a control device 312e and determines the execution of one mode unit among the first to fourth mode units 312a to 312d based on the number counted at the counter 311.

Data necessary for controlling the offset compensation amplifying block 213 are stored on the register 313. The data of the register 313 control the offset compensation amplifying block 213 by changing assigned data values according to an output signal of the controller 312.

The control device 312e determines the fast compensation mode and the regular compensation mode based on the counted value provided from the counter 311. More specifically, the counted value from the counter 311 is indicative of a degree of DC offset. The greater or less the counted value is, the more severe the DC offset is.

If the DC offset is severe, the fast compensation mode is executed to change a data value of the register 313 into a value greater than the originally assigned data value. If the offset is not severe, the regular compensation mode is executed to change a data value of the register 313 into a value less than the originally assigned data value. If the counted value provided from the counter 311 is an appropriate value, the data value of the register 313 is maintained.

The first mode unit 312a for the fast down-compensation mode subtracts a positive integer A that is greater than '1' from the data value of the register 313. The second mode unit 312b for the regular down-compensation mode subtracts a positive integer that is less than the positive integer A from the data value of the register 313. The third mode unit 312c for the fast up-compensation mode adds a positive integer C that is greater than '1' to the data value of the register 313. The fourth mode unit 312d for the regular up-compensation mode adds a positive integer D that is less than the positive integer C to the data value of the register 313.

Even if the compensation modes have substantially the same scheme, different values are subtracted from the data value of the register 313 in the fast compensation mode and the regular compensation mode to differentiate a compensation degree according to the DC offset degree.

In the fast compensation mode, as the value that is added to or subtracted from the data value of the register 313 increases, the offset compensation degree also increases. Therefore, as compared with the added or subtracted value in the regular compensation mode, the greater value is added or subtracted from the data value of the register 313 in the fast compensation mode.

The above approach allows the adaptive and fast DC offset compensation according to the DC offset degree.

If the value added to or subtracted from the data value of the register 313 is too eat, the compensation for the data value of the register 313 is done more excessively than the expected compensation degree. As a result, another offset with an opposite polarity direction may occur.

For instance, assuming that a severe positive polarity direction DC offset event occurs at a first period and thus, the DC offset compensation is aimed to a negative polarity direction, if the compensation is performed to a great extent, a counted value of the counter 311 at a second period may indicate a severe level of negative polarity direction DC offset. Thus, the DC offset compensation is aimed to a positive polarity direction again to a great extent. As a result, at a third period, a counted value of the counter 311 indicates a severe level of positive polarity direction DC offset. Thus, the DC offset compensation apparatus compensates for the severe positive polarity direction DC offset, resulting in a great degree of the negative polarity direction DC offset.

As a result, when the excessive compensation occurs during the fast compensation mode, an infinite loop that infinitely and alternately runs the fast down-compensation mode and the fast up-compensation mode is generated. This infinite loop distorts the DC offset compensation.

Hence, in the case of the fast up-compensation mode or the fast down-compensation mode, the controller 312 is set at a next period to add or subtract a value that is less than the value from the precedent period to or from the data value of the register 313.

When the fast compensation mode is performed as described above (i.e., the addition or subtraction of the predetermined value to or from the data value of the register 313 at the next period), the data value of the register 313 converges into a certain value while oscillating with a consistent value.

Accordingly, the infinite loop generation can be impaired while performing the DC offset compensation, and the distortion of the DC offset compensation does not occur.

Figure 4:
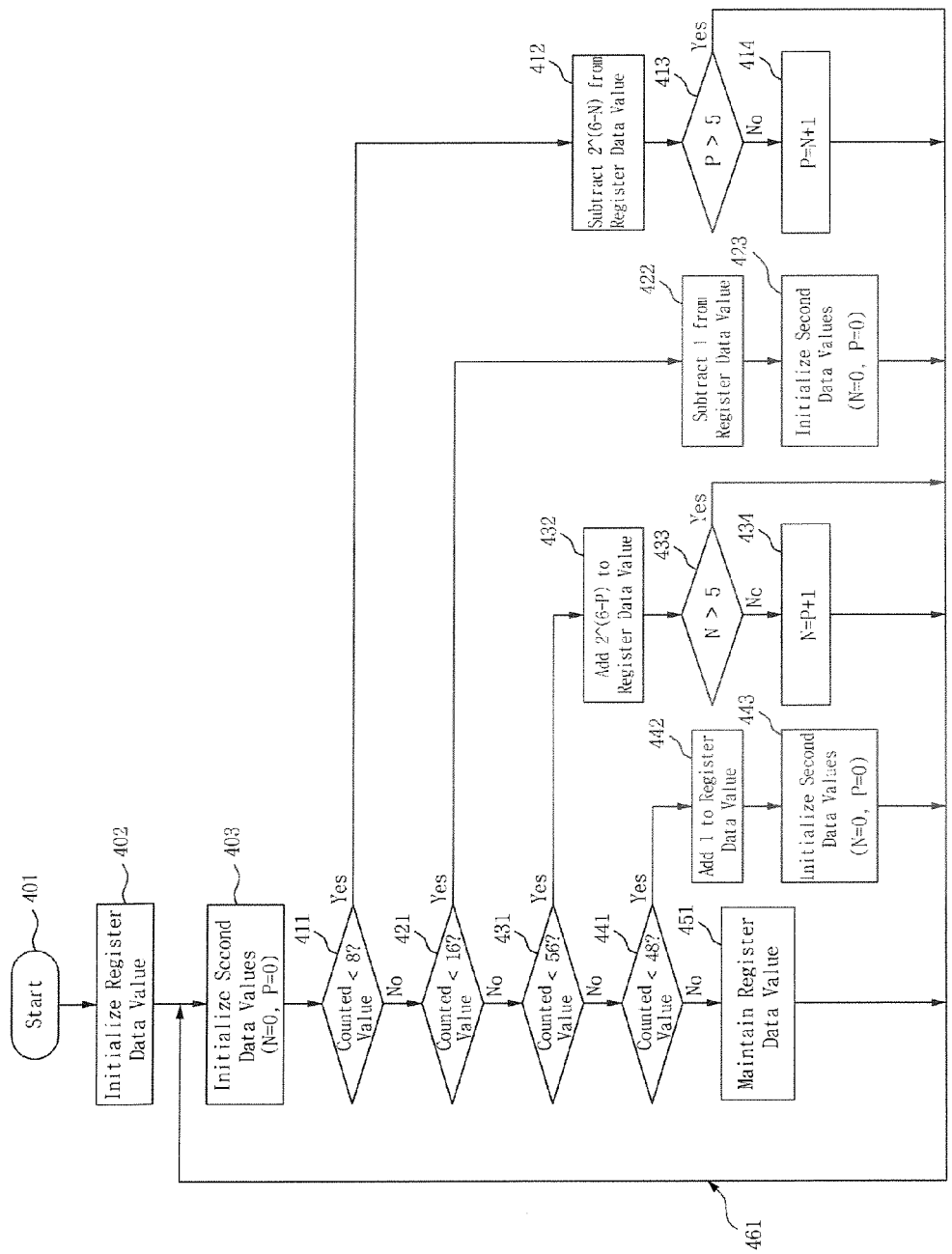
FIG. 4 illustrates a flowchart to describe sequential compensation operations at an offset compensation block based on a DC offset compensation method according to an embodiment of the present invention.

FIG. 4 illustrates a flowchart to describe sequential compensation operations at the offset compensation block 212 illustrated in FIG. 3 based on the DC offset compensation method according to an embodiment of the present invention.

In operation of 401, the offset compensation block 212 starts operating. In operation of 402, a data value of the register 313 is initialized to an assigned value. The data value of the register 313 controls the offset compensation amplifying block 213 illustrated in FIG. 3. Second data values N and P are initialized to '0' in operation of 403. The second data values control a distortion event of the offset compensation which will be described later.

The counter 311 illustrated in FIG. 3 counts a polarity of DC offset. If a predetermined period is 64, the counter 311 counts polarities of DC offsets that have been detected by the offset detection block 211 till a $63^{rd}$ period. At a $64^{th}$ period, the counter 311 is reset.

The counted value provided by the counter 311 is compared with a first reference value '8'. If the counted value is less than the first reference value, in operation of 411, the fist mode unit 312a for the fast down-compensation mode performs a first mode. In operation of 412, the first mode performs the subtraction of a value of '2^(6−N)' from the data value of the register 313. A changed data value of the register 313 is transferred to the offset compensation amplifying block 213 to implement the fast down-compensation for the DC offset.

If the counted value is greater than the first reference voltage, in operation of 421, the counted value is then compared with a second reference value '16'. If the counted value is less than '16', the second mode unit 312b for the regular down-compensation mode performs a second mode. In operation of 422, the second mode performs the subtraction of '1' from the data value of the register 313. The changed data value of the register 313 is transferred to the offset compensation amplifying block 213 to implement the regular down-compensation for the DC offset.

If the counted value is greater than '16', the counted value is compared with a third reference value '56'. If the counted value is greater than '56', in operation of 431, the third mode unit 312c for the fast up-compensation mode performs a third mode. In operation of 432, the third mode performs the addition of a value of '2^(6−P)' to the data value of the register 313. The changed data value of the register 313 is transferred to the offset compensation amplifying block 213 to thereby implement the fast up-compensation for the DC offset.

If the counted value is less than '56', the counted value is compared with a fourth reference value '48'. If the counted value is greater than '48', the fourth mode unit 312d for the regular up-compensation mode performs a fourth mode in operation of 441. In operation of 442, the fourth mode performs the addition of '1' to the data value of the register 313. The changed data value of the register 313 is transferred to the offset compensation amplifying block 213 to thereby implement the regular up-compensation for the DC offset.

If the counted value is less than '48', the current data value of the register 313 is maintained.

After one period, in operation of 461, a feedback operation is performed. That is, the above cycle returns to the count operation to perform the above described sequential operations for a next period.

Controlling the offset compensation distortion that is often caused by the infinite loop generated when the fast up-compensation or down-compensation mode is performed will be described in detail herein below.

If the counted value at a first period corresponds to the fast down-compensation mode, as described above, in operations of 411 and 412, the value of '2^(6−N)' is subtracted from the data value of the register 313. Since the second data value N is '0', '64' is subtracted from the data value of the register 313. At this time, another second data value P is compared with '5'. If the other second data value P is less than '5', in operations of 413 and 414, a value of 'N+1' is stored as the other second data value P. Since the initial second data value P is '0', the other second data value P is less than '5'. Thus, '1' is added to the initial second data value N and then, this added value of '1' is stored as the other second data value P.

In the case that the DC offset is excessively compensated by subtracting 64 from the data value of the register 313, if a counted value at a second period is greater than '56', the fast up-compensation mode is performed in operation of 431. In the fast up-compensation mode, the value of '2^(6−P)' needs to be added to the data value of the register 313. Since the other second value P at the first period is '1', the data value of the register 313 is added with the value of '32' computed from '2^(6−1)' in operation of 432. At this time, the second data value N is compared with '5', and if the second data value N is less than '5', in operations of 433 and 434, the computation of N=P+1 is performed. Therefore, the second data value N becomes '2'.

In the case that the DC offset at the second period is still excessive, if a counted value at a third period is greater than '56', in operation of 411, the fast down-compensation mode is performed. In the fast down-compensation mode, a value of '2^(6−N)' need to be subtracted from the data value of the register 313. Since the second data value N is '2' at the second period, a value of '16' computed from '2^(6−2)' is subtracted from the data value of the register 313 in operation of 412. At this time, if the other second value P is less than '5', the computation of P=N+1 is performed in operations of 413 and 414. Therefore, the other second data value P becomes '3'.

Changing the second data values N and P makes it possible to control the offset compensation distortion event, which usually occurs due to the infinite loop of the fast down-compensation and up-compensation modes.

For the regular up-compensation mode or the regular down-compensation mode, a value of '1' is added to or subtracted from the data value of the register 313, the offset compensation distortion event is less likely to occur. Therefore, the second data values N and P are initialized to '0' in operations of 423 and 443.

For the comparison of the second data values N and P with the reference value of '5' in operations of 413 and 433, since the values that are added to or subtracted from the data value of the register 313 are '2^(6−N)' and '2^(6−P)', the comparative reference value is set to be less than '6' because of the subtraction of the second data values N and P from '6'. Therefore, if the values of '(6−N)' and '(6−P)' are changed, the reference value '5' may be also changed.

The above-described DC offset compensation method can be implemented as a program and stored on a computer readable recording medium.

According to various embodiments of the present invention, DC offset can be compensated adaptively according to a continuously changing DC offset value.

Also, on the basis of the exemplary embodiments of the present invention, the DC offset compensation distortion, which usually occurs due to the excessive DC offset compensation, can be controlled.

Although the present embodiment exemplifies the DC offset compensation through using the four different modes, other compensation modes are still possible. Since the adaptive compensation according to the DC offset degree is the main technical sprit of the present invention, the scope and sprit of the present should not be limited by the number of the compensation modes.

The above-described logic operations according to the multiple reference values are one exemplary embodiment of the technical sprit of the present invention. Thus, the scope and sprit of the present invention should not be limited to the aforementioned logic operations. The values added to or subtracted from the data value of the register in the fast up-compensation mode, the regular up-compensation mode, the fast down-compensation mode, and the regular down-compensation mode can be changeable, and thus, should not be construed as limiting the scope and sprit of the present invention.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A direct current (DC) offset compensation apparatus comprising:
   an offset detection block detecting a DC offset;
   an offset compensation block operating according to an output signal of the offset detection block; and
   an offset compensation amplifying block controlled according to an output signal of the offset compensation block,
   wherein the offset compensation block comprises:
      a counter counting polarities of DC offsets for a predetermined period using the output signal of the offset detection block;
      a controller comprising:
         a first mode unit operating a fast down-compensation mode for the DC offset;
         a second mode unit operating a regular down-compensation mode for the DC offset;
         a third mode unit operating a fast up-compensation mode for the DC offset;
         a fourth mode unit operating a regular up-compensation mode for the DC offset; and
         a control device controlling the execution of one selected among the first to fourth mode units based on a value counted by the counter; and
      a register storing data to control the offset compensation amplifying block based on the one mode unit determined by the controller.

2. The DC offset compensation apparatus of claim 1, wherein the offset detection block comprises a comparator.

3. The DC offset compensation apparatus of claim 1, wherein the offset detection block further comprises a low pass filter.

4. The DC offset compensation apparatus of claim 1, wherein the first mode unit subtracts a positive integer A greater than 1 from a data value of the register; the second mode unit subtracts a positive integer B less than the positive integer A from the data value of the register; the third mode unit adds a positive integer C greater than 1 to the data value of the register; and the fourth mode unit adds a positive integer D less than the positive integer C to the data value of the register.

5. The DC offset compensation apparatus of claim 4, wherein at a period after the predetermined period, the first mode unit of the controller subtracts a positive integer that is less than the positive integer A but greater than the positive integer B from the data value of the register; and the third mode unit of the controller subtracts a positive integer that is less than the positive integer C but greater than the positive integer D from the data value of the register.

6. A DC offset compensation method comprising:
   (a) initializing data stored on a register;
   (b) counting polarities of DC offsets for a predetermined period;
   (c) performing a first compensation mode in which a counted value obtained from the operation (b) is compared with a first reference value and a first offset compensation mode is performed for one case that the counted value is greater or less than the first reference value;
   (d) performing a second compensation mode in which the counted value obtained from the operation (b) is compared with a second reference value and a second offset compensation mode is performed for one case that the counted value is greater or less than the second reference value;
   (e) performing a third compensation mode in which the counted value obtained from the operation (b) is compared with a third reference value and a third offset compensation mode is performed for one case that the counted value is greater or less than the third reference value; and
   (f) performing a fourth compensation mode in which the counted value obtained from the operation (b) is compared with a fourth reference value and a fourth offset compensation mode is performed for one case that the counted value is greater or less than the fourth reference value.

7. The DC offset compensation method of claim 6, further comprising:
   at the first compensation mode, subtracting a value of $2^n$ from the data value of the register;
   at the second compensation mode, subtracting a value of 1 from the data value of the register;
   at the third compensation mode, adding a value of $2^m$ to the data value of the register; and
   at the fourth compensation mode, adding a value of 1 to the data value of the register.

8. The DC offset compensation method of claim 7, further comprising performing a feedback operation returning to the operation (b) at a period after the predetermined period.

9. The DC offset compensation method of claim 8, wherein the n is a value of 6−N and the m is a value of 6−P, wherein the N and P are another data values, which are integers, wherein the operation (a) further comprises initializing the integers N and P; the operation (c) further comprises comparing the integer P with a fifth reference value and storing a value of N+1 as the integer P if the integer P is less than the fifth reference value; each of the operations (d) and (f) further comprises initializing the integers N and P; and the operation (e) further comprises comparing the integer N with a sixth reference value and storing a value of P+1 as the integer N if the integer N is less than the sixth reference value.

10. The DC offset compensation method of claim 9, wherein the N and P have initialization values of 0; and the fifth and sixth reference values are 5.

11. A computer readable recording medium implemented with a program to embody a DC offset compensation method, the computer readable recording medium comprising the instructions of:
   (a) initializing data stored on a register;
   (b) counting polarities of DC offsets for a predetermined period;
   (c) performing a first compensation mode in which a counted value obtained from the operation (b) is compared with a first reference value and a first offset compensation mode is performed for one case that the counted value is greater or less than the first reference value;
   (d) performing a second compensation mode in which the counted value obtained from the operation (b) is compared with a second reference value and a second offset compensation mode is performed for one case that the counted value is greater or less than the second reference value;
   (e) performing a third compensation mode in which the counted value obtained from the operation (b) is compared with a third reference value and a third offset compensation mode is performed for one case that the counted value is greater or less than the third reference value; and (f) performing a fourth compensation mode in which the counted value obtained from the operation (b) is compared with a fourth reference value and a fourth offset compensation mode is performed for one case that the counted value is greater or less than the fourth reference value.

* * * * *